April 21, 1959

M. SMOLENSKY 2,882,923

BACKWATER CHECK MEANS FOR DRAINAGE SYSTEMS

Filed June 28, 1955

INVENTOR.
MICHAEL SMOLENSKY
BY
Golrick & Golrick
ATTORNEYS

United States Patent Office 2,882,923
Patented Apr. 21, 1959

2,882,923
BACKWATER CHECK MEANS FOR DRAINAGE SYSTEMS

Michael Smolensky, Cleveland Heights, Ohio

Application June 28, 1955, Serial No. 518,448

1 Claim. (Cl. 137—515.5)

This invention relates to a flow checking element adapted to incorporation in drain or sewage lines for checking backwater flow that is, flow in a direction reverse to normal drainage.

In the prior art, one effective type of backwater checking device in common use where there may be substantial drainage volume includes a hollow body incorporated in the sewer line wherein there is hung a so-called flap, a swinging disk or plate element movable away from a seat formation on the body toward a downstream direction to permit direct flow of normal drainage and movable back against the seat to close off the line when the backwater flow begins, thereby preventing flooding of the area drained. However, such prior checking devices adapted for installation between piping elements have entailed the use of a relatively large hollow cast metal body having an access opening for installation of the hung flap element and a cover plate for the opening, with consequent material and machining labor costs.

The present invention is directed toward the provision of a backwater check structure operating in the manner of the above noted type which is, however, quite simple in structure and assembly and which is adapted for direct insertion between two conduit elements of a drainage or sewage line. An insert is provided in the form of an apertured disk having on opposite sides cylindrical spigot flange portions respectively adapted to insertion in upstream and downstream sewage conduit elements in telescoped type joints, a seat formation being provided within the confines of the cylindrical flange on the downstream side for a movable check plate hung also on the downstream side of the disk. The mounting of the movable plate is easily effected in manufacture and the very incorporation of the insert between conduit elements of the sewage line provides the housing, in effect, for both seat and movable plate whereby the cast hollow metal body of prior devices with attendant material and machining cost is obviated.

Fig. 1 of the drawings shows in substantially vertical axial section part of a drainage system incorporating the present invention;

Figure 1:
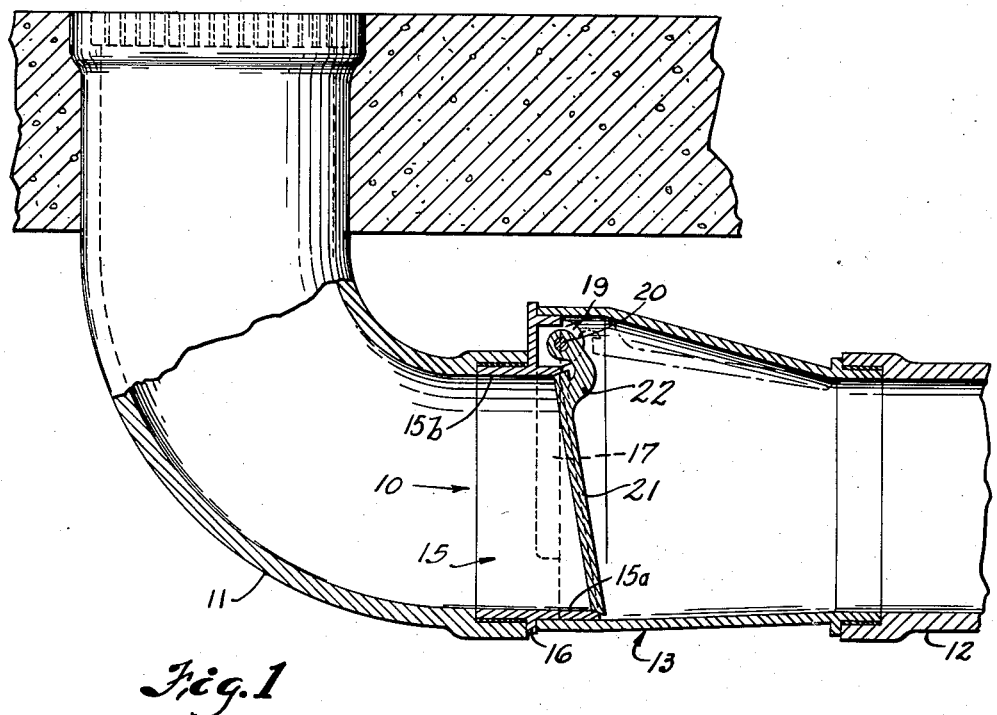
Figure 2:
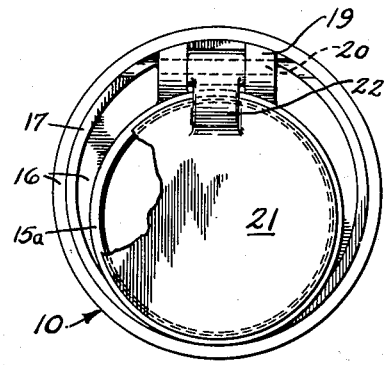
Fig. 2 is a right end view of the flow checking insert appearing in Fig. 1.

In Fig. 1 of the drawing, the flow checking insert structure 10 of this invention is shown incorporated in a floor drainage system between a vertically disposed 90° sewer pipe elbow 11 and the end section 12 of a horizontal sewer pipe run of equal pipe diameters, the upper end of the elbow being set flush in a concrete floor and provided with a suitable grating, and an eccentric type adapter 13 being used as a conduit element connecting the horizontal run of pipe 12 to the right side of insert element 10.

The insert structure 10 has a body or base preferably formed as an integral element including a cylindrical conduit portion 15 provided near its mid-length with a circular but eccentric radial flange 16, and a cylindrical or annular spigot flange 17 concentric with and projecting from the right side or face of the disk-like flange portion 16 which is also eccentric to conduit 15 in an upward direction and merges into the latter near the bottom of the insert.

To the right of the flange 16, in the space between the top of spigot end flange 17 and conduit 15 a pair of integral lugs 19, equi-spaced on opposite sides of the vertical plane defined by the axes of spigot flange 17 and conduit 15, are bored at right angles to said plane to receive in the aligned bores a pivot pin 20.

A swingable check plate 21 is supported through its upwardly extending centrally located integral arm 22 reflected from the outer or free plate face to the pivot pin 20, to swing outwardly to the right from a closed position against the right end of the conduit 15, permitting flow of water through the insert.

The right end 15a of conduit 15, almost the entire edge of which extends beyond the end of spigot flange 17, is substantially an ellipse of which the plane is tilted toward the disk 16, in effect the right end being terminated by an imaginary intersecting plane inclined from a radial position, at an angle of about 10° toward the plane of disk 16 as shown and perpendicular to the plane of the axes aforementioned. The check member 21 is correspondingly shaped and peripherally bevelled to mate when in closed position with a female bevel in the elliptical end portion of the conduit as a seat.

With the flange 17 carried as a continuous arch over and across the lugs 19 and the pin 20 spaced from the disk 16, the bore through the lugs is carried out on one or both sides through the flange 17 to permit insertion of the pivot pin in the lugs and through the bored upper end of arm 22.

Figure 3:
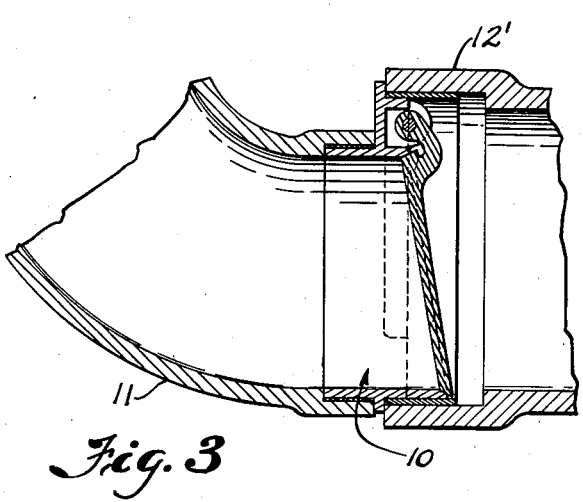
Fig. 3 is a view similar to Fig. 1 showing adaptability of the flow checking insert for incorporation in a second environment in a drainage system.

As shown, the upstream cylindrical flange part 15b of conduit 15, projecting from the left or rear face of disk 16, provides a short right cylindrical spigot joint element which may be inserted in and sealed or caulked to sewer pipe for a joint on the upstream side of the flow checking element; while the right cylindrical spigot element 17 of larger diameter extending eccentrically in the opposite direction, may in like fashion be inserted in and sealed or caulked to the end of a larger mouthed pipe 12' leading to the main sewer line for a joint on the downstream side (see Fig. 3). In Fig. 1 however, the cast metal eccentric adapter 13 is used as a conduit element to interpose the flow checking element between sewer pipes of like size, the larger end of the adapter being press fitted or sweated onto the cylindrical portion including the flange 17, as shown, or caulked thereto. In either manner of connection for the downstream side of the unit, the eccentric enlargement to the right or forwardly of the disk 16 provides clearance for the disk or plate 21 to swing outwardly and upwardly under flow of water from the drain toward the sewer. The inclination of the seat for swingable check plate 21 and the location of the pivot 20 rearwardly of the seat causes the plate to tend to gravitate toward seated position, so that with no drainage flow the plate element is normally at closed position or with incipient reverse flow moves immediately to closed position, providing an obstruction or check in either case to prevent flooding of the drained area by backwater flow.

The body of the insert may be considered as comprised of a round disk corresponding to flange 16 eccentrically apertured toward the bottom, with a cylindrical spigot flange—the left end 15b of conduit 15—extending from the left side thereof coaxial to and circumscribing the disk aperture adapted to serve as the male part of a telescoping joint with an upstream drainage conduit element; a second cylindrical spigot portion extending from the right side of the disk and coaxial or concentric therewith—the flange 17 considered as continuous through 360°—with bottom on a level with the bottom of the first cylindrical flange, as the male part in a like joint to a downstream drainage conduit element of larger diameter; the disk portions external to those cylindrical spigot flanges serving as stops against which the ends of the drainage conduit elements may abut; and an oblique seat slanting inwardly and upwardly toward the disk 16 formed in part on the bottom of the second cylindrical element and a smaller cylindrical flange 15a on the right side of the disk coaxially surrounding the aperture in alignment with 15b and merging tangentially into the second cylindrical element.

I claim:

A check valve mechanism for use in a sewer drainage line between two consecutive upstream and downstream elements thereof consisting of an insert between the elements, said insert comprising: a disk-like integral base structure having a concentric cylindrical spigot flange on one disk face for insertion as a male element of a telescoping joint with the hub of a downstream element, a cylindrical valve seat flange extending from the disk-like structure in downstream direction and in eccentric relation to the disk-like structure and tangentially merging with said first flange at the bottom regions of the two flanges, a third cylindrical flange on the disk-like structure extending upstream and in alignment with the cylindrical valve seat flange for forming a spigot connection with an upstream element, hinge lugs located between the top regions of the downstream extending flanges, and a swingable checking element pivotally suspended on said lugs whereby the spigot connection between the first said flange and a downstream element overlies the pivotal suspension of the swingable checking element.

References Cited in the file of this patent
UNITED STATES PATENTS

| | | |
|---|---|---|
| 279,459 | Sullings | June 12, 1883 |
| 1,063,637 | Barker | June 3, 1913 |
| 1,212,611 | Davis | Jan. 16, 1917 |
| 1,536,869 | Kizer | May 5, 1925 |
| 1,648,486 | Larsen | Nov. 8, 1927 |